United States Patent
Röhrle et al.

(10) Patent No.: US 6,926,221 B2
(45) Date of Patent: Aug. 9, 2005

(54) BELT RETRACTOR FOR A VEHICLE SAFETY BELT

(75) Inventors: Martin Röhrle, Mutlangen (DE); Wolfgang Holbein, Alfdorf (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 10/441,699

(22) Filed: May 20, 2003

(65) Prior Publication Data

US 2003/0222452 A1 Dec. 4, 2003

(30) Foreign Application Priority Data

May 28, 2002 (DE) .................................. 202 08 319 U

(51) Int. Cl.[7] .............................................. B60R 22/28
(52) U.S. Cl. ................................................. 242/379.1
(58) Field of Search ........................ 242/379.1; 280/805, 280/806; 297/472, 478

(56) References Cited

U.S. PATENT DOCUMENTS

| | | | | |
|---|---|---|---|---|
| 4,702,353 A | * | 10/1987 | Yang | 242/379.1 |
| 5,618,006 A | * | 4/1997 | Sayles | 242/379.1 |
| 5,899,399 A | * | 5/1999 | Brown et al. | 242/379.1 |
| 5,913,538 A | * | 6/1999 | Herpich | 242/379.1 |
| 5,924,641 A | * | 7/1999 | Keller et al. | 242/379.1 |
| 6,616,081 B1 | * | 9/2003 | Clute et al. | 242/379.1 |
| 6,676,059 B1 | * | 1/2004 | Bell et al. | 242/379.1 |
| 2002/0066817 A1 | * | 6/2002 | Clute et al. | 242/379.1 |

FOREIGN PATENT DOCUMENTS

| | | |
|---|---|---|
| DE | 1913448 | 3/1969 |
| EP | 0791513 A1 | 8/1997 |

* cited by examiner

*Primary Examiner*—John M. Jillions
(74) *Attorney, Agent, or Firm*—Tarolli, Sundheim, Covell & Tummino L.L.P.

(57) ABSTRACT

A belt retractor for a vehicle safety belt comprises a frame, a belt reel rotatably mounted in the frame, and an energy converter coil having at least one metal strip. The energy converter coil has a plurality of metal strips which are disposed symmetrically with respect to the middle axis of the belt reel.

8 Claims, 7 Drawing Sheets

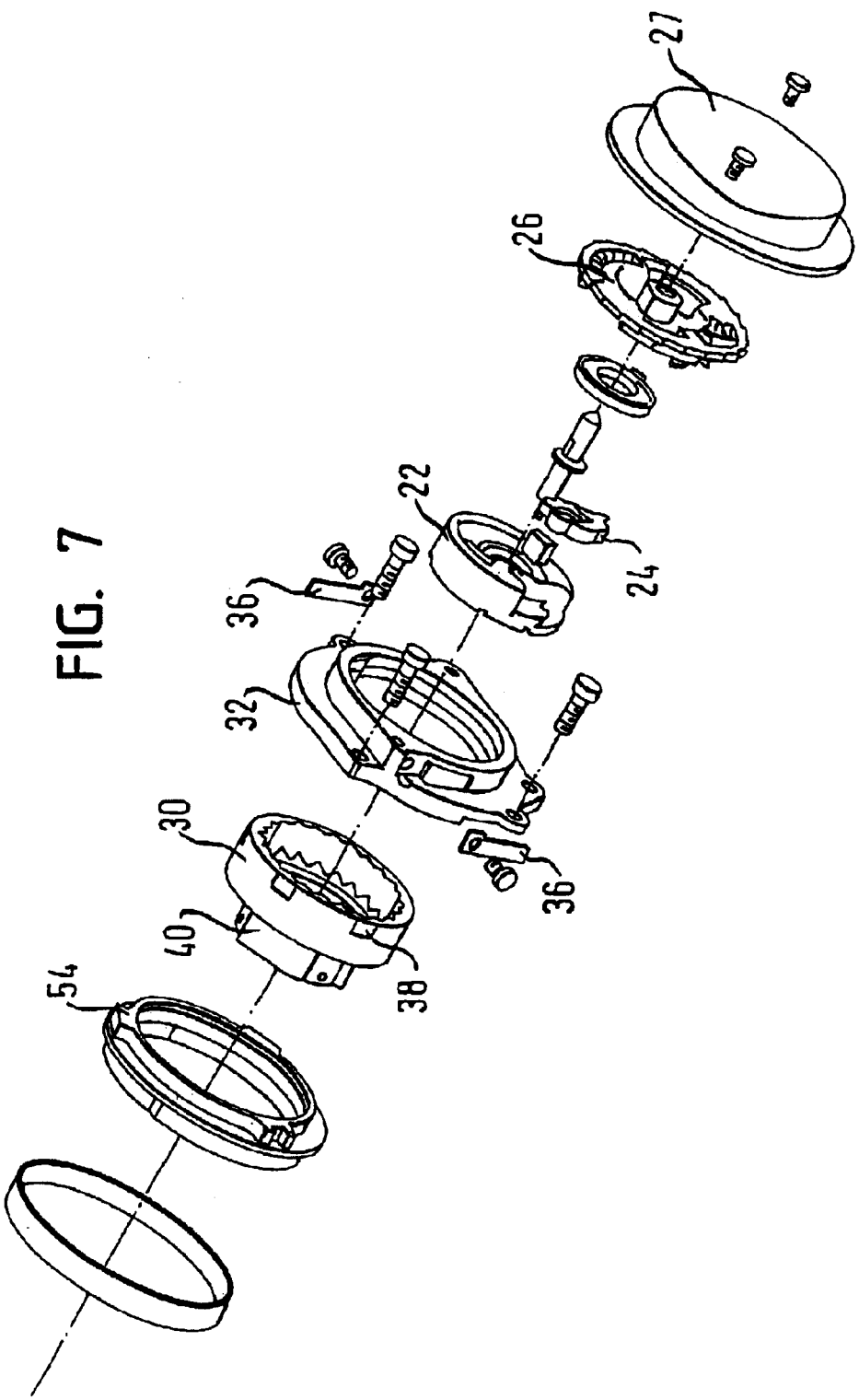

BELT RETRACTOR FOR A VEHICLE SAFETY BELT

TECHNICAL FIELD

This invention relates to a belt retractor for a vehicle safety belt.

BACKGROUND OF THE INVENTION

Conventional belt retractors comprise a frame, a belt reel rotatably mounted in the frame, and an energy converter coil having at least one metal strip.

Such belt retractor is known from the German Patent Application 19 13 448. The energy converter coil consists of a metal strip which is accommodated in a drum in a first direction along the inner wall thereof. One end of the metal strip is connected with the drum with which the belt reel is connected as well. The other end is connected with a shaft which has a blocking wheel. In the blocking wheel a blocking pawl can engage, which is actuated by a vehicle-sensitive sensor. In the initial condition, the blocking wheel can rotate freely, so that the unit comprising shaft, metal strip, drum and belt reel can rotate freely. As soon as the blocking pawl engages in the blocking wheel, the shaft is locked in place. If in this condition particularly high forces act in the safety belt, such a high torque will be active between the drum and the shaft that the metal strip accommodated in the drum is wound up onto the shaft in a direction which is opposite to the direction in which the metal strip was accommodated in the drum originally. In this process, the metal strip is bent twice, namely first by about 180°, so that the metal strip extends in the opposite direction, and is then bent back a bit, so that the metal strip conforms to the curvature of the shaft. This bending resistance acts as resistance torque between the drum and the shaft, which in a known manner represents a limitation of the force maximally acting in the safety belt.

The disadvantage of this known construction consists in that there is an asymmetrical force distribution in the energy converter coil.

Thus, the object of the invention consists in developing a belt retractor as mentioned above such that more uniform force conditions are obtained.

BRIEF SUMMARY OF THE INVENTION

According to the invention, a belt retractor for a vehicle safety belt comprises a frame, a belt reel rotatably mounted in the frame, and an energy converter coil having at least one metal strip. The energy converter coil has a plurality of metal strips which are disposed symmetrically with respect to the middle axis of the belt reel. In this way, a symmetrical load distribution is obtained, which leads to a particularly low load on the shaft engaged by the metal strips and on the bearing of the belt reel. It is particularly advantageous when three metal strips are used, which engage the shaft offset by an angle of 120° each.

In accordance with the preferred embodiment of the invention, a second energy converter coil is provided which can be selectively deactivated. In this way, there is obtained a selectable force limitation characteristic. For instance, both energy converters may initially be connected in parallel, so that in a first phase a particularly high belt webbing force is required to achieve a relative rotation between the drum and the shaft of the energy converter. After the first phase, the second energy converter can be deactivated, for instance time-controlled or controlled by an angle of rotation, so that then a lower belt webbing force is required to obtain a relative rotation between the drum and the shaft.

Preferably, it is provided that the second energy converter coil has an outer ring, a holding pawl being provided by means of which the holding ring can be supported on the frame. In this way, the second energy converter can be deactivated in a mechanically simple, reliable way. For actuating the holding pawl a pyrotechnical actuator may be provided.

The characteristic of the energy converters can also be varied in that the thickness of the metal strips or the width of the metal strips changes along their length.

In accordance with the preferred embodiment of the invention it is provided that mounted to the belt reel is a blocking pawl which can be brought in engagement with blocking teeth of a blocking ring, and that the blocking ring is rotatably accommodated in a housing at which a leaf spring is mounted, which engages in a pocket on the outer periphery of the blocking ring. The leaf springs act as return stop, which prevents that after a force limiting operation the blocking ring is rotated back together with the belt reel under the spring action of the metal strips. If such reverse rotation would be allowed, an undesired, large belt slack would be produced in a secondary crash; a restraining effect would only be ensured again, when the metal strips are biased again by a relative rotation between the shaft and the drum.

BRIEF DESCRIPTION OF THE DRAWINGS

FIG. 7 shows the remaining components of the belt retractor in accordance with FIGS. 1 to 5 in a perspective exploded view.

DETAILED DESCRIPTION OF THE PREFERRED EMBODIMENT

The belt retractor has a frame 10 in which a belt reel 12 is rotatably mounted. The belt reel can accommodate a safety belt which is not represented. At the left end of the belt reel with respect to FIG. 1, a wind-up spring 14 is provided, which acts on the belt reel such that it winds up the safety belt.

Figure 1:
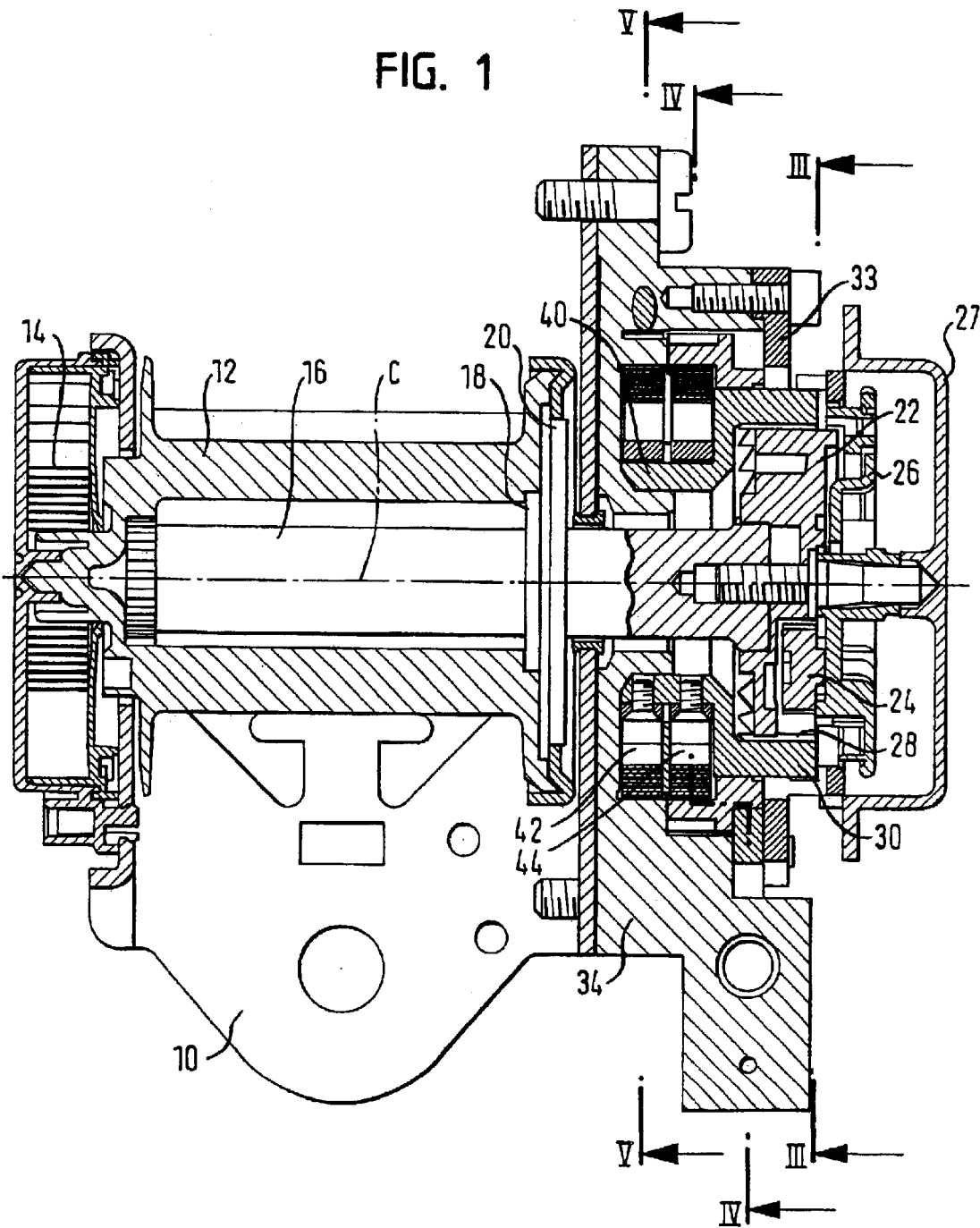
FIG. 1 shows a cross-section of a belt retractor in accordance with the invention.
Figure 2:
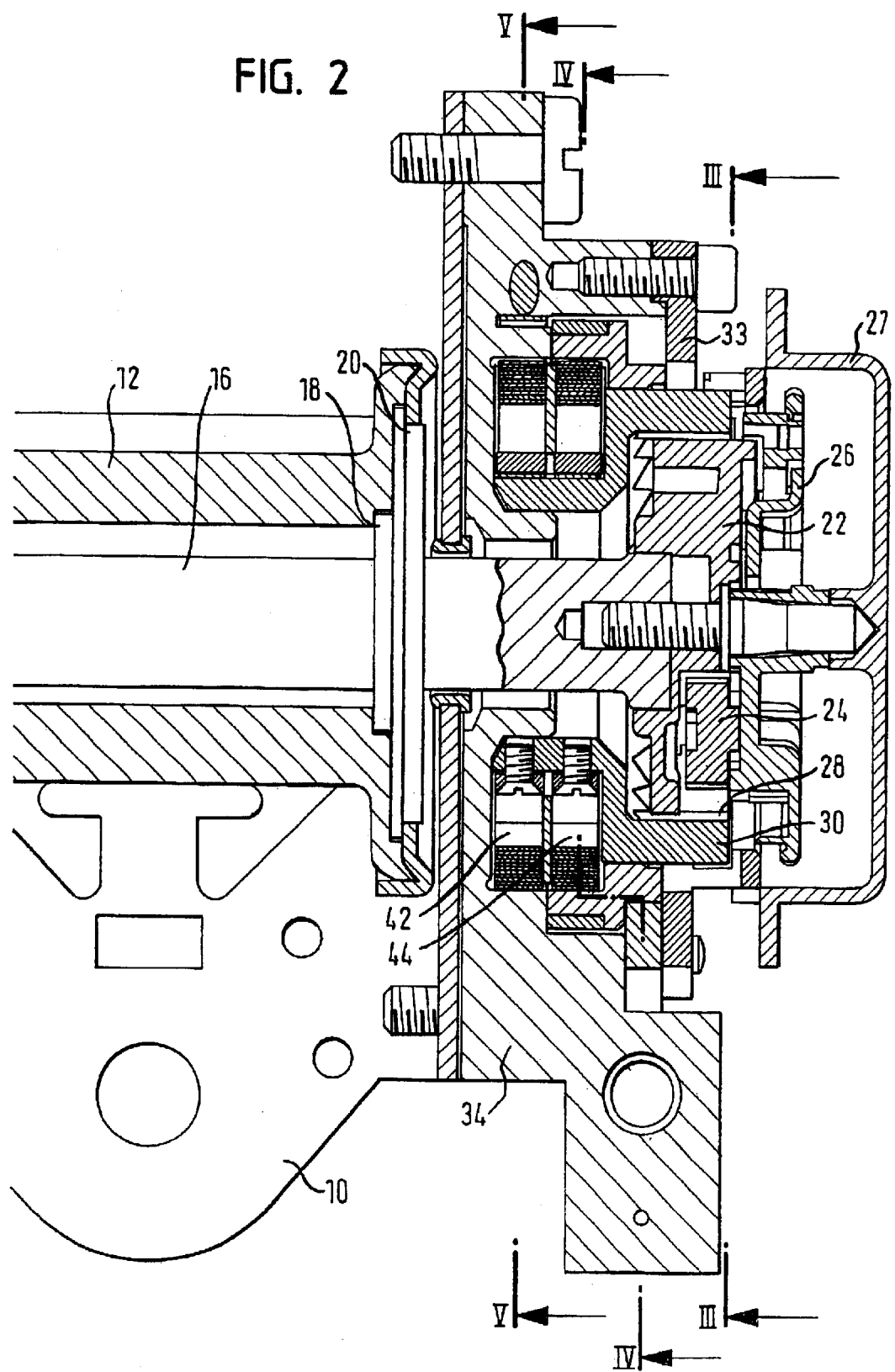
FIG. 2 shows a segment of FIG. 1 on an enlarged scale.

In the interior of the belt reel 12 a torsion-resistant shaft 16 is disposed, which at the left end with respect to FIG. 1 is non-rotatably connected with the belt reel 12. At the right end of the belt reel with respect to FIG. 1, the shaft 16 is provided with a first bearing collar 18 and a second bearing collar 20, so that the belt reel is supported at this end.

The shaft 16 can also be integrally formed with the belt reel.

At its end facing way from the belt reel 12, the shaft 16 is non-rotatably provided with a blocking disc 22, on which a blocking pawl 24 is supported. By means of a conventional blocking mechanism, of which there is merely shown a cam disc 26 covered by a cover 27, the blocking pawl 24 can be moved from its rest position shown in FIG. 3 radially outwards and in engagement with blocking teeth 28, which are formed on the inner periphery of a blocking ring 30. The blocking ring 30 is surrounded by a holding ring 32, which is mounted at a housing 34. The housing 34 in turn is firmly mounted to the frame 10 of the belt retractor. In the holding ring 32, two leaf springs 36 (see in particular FIG. 3) are mounted, which extend approximately tangentially with respect to the blocking ring 30, where they each engage in a pocket 38. The leaf springs 36 are disposed diametrically opposite each other; in combination with the pockets 38 they act as return stop preventing a rotation of the blocking ring 30 in the direction of belt winding.

A hub 40 is integrally formed with the holding ring 30, which hub adjoins the blocking ring 30 on its side facing the belt reel 12. On the hub, two energy converter coils 42, 44 are disposed.

Figure 5:
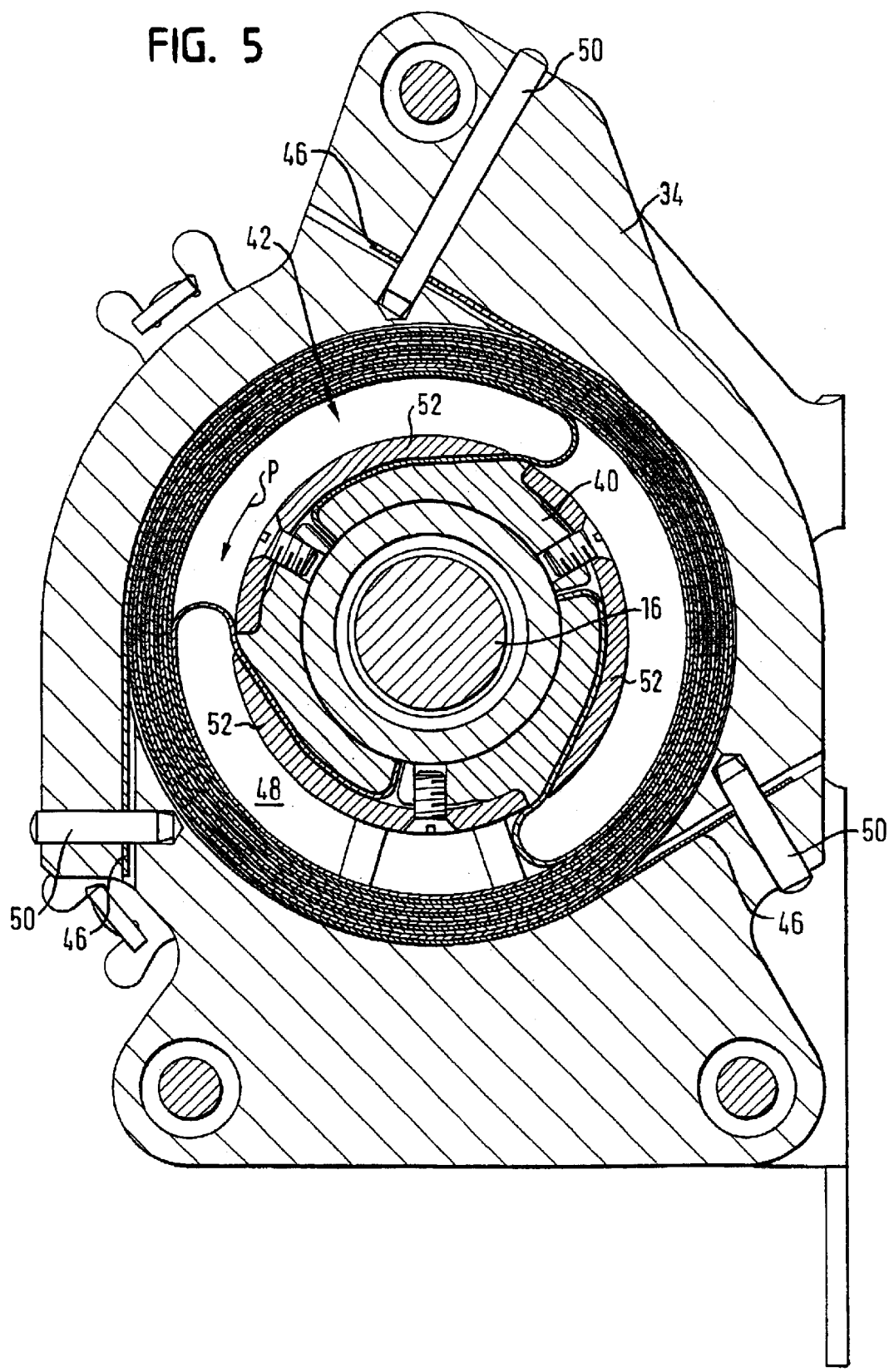
FIG. 5 shows a section along plane V—V of FIG. 2.
Figure 6:
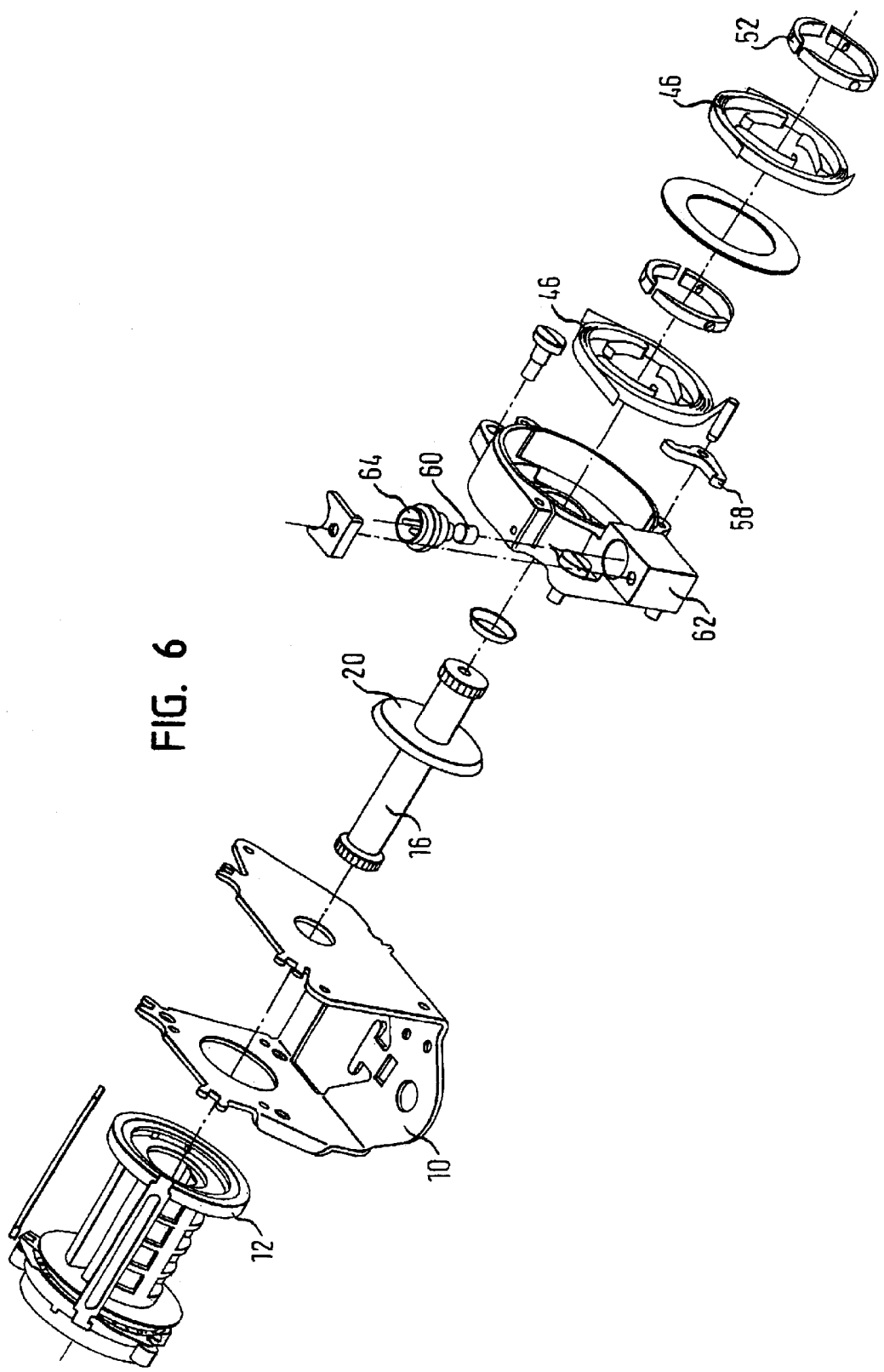
FIG. 6 shows a few components of the belt retractor of FIGS. 1 to 5 in a perspective exploded view.

The first energy converter coil 42 (see in particular FIG. 5) has three metal strips 46, which are disposed in a drum-shaped accommodation space 48 in the interior of the housing 34. With respect to FIG. 5, each metal strip extends from its outer end attached to the housing 34 by means of a fixing pin 50 in clockwise direction along the cylindrical wall of the accommodation space 48. Each metal strip 46 is guided around the hub 40 over almost four windings and is then connected with the hub against the winding direction. For this purpose a clamping segment 52 is used, which is screwed to the hub 40. Thus, in the package of metal strips extending along the wall of the accommodation space 48, the three individual strips alternately follow each other.

Figure 4:
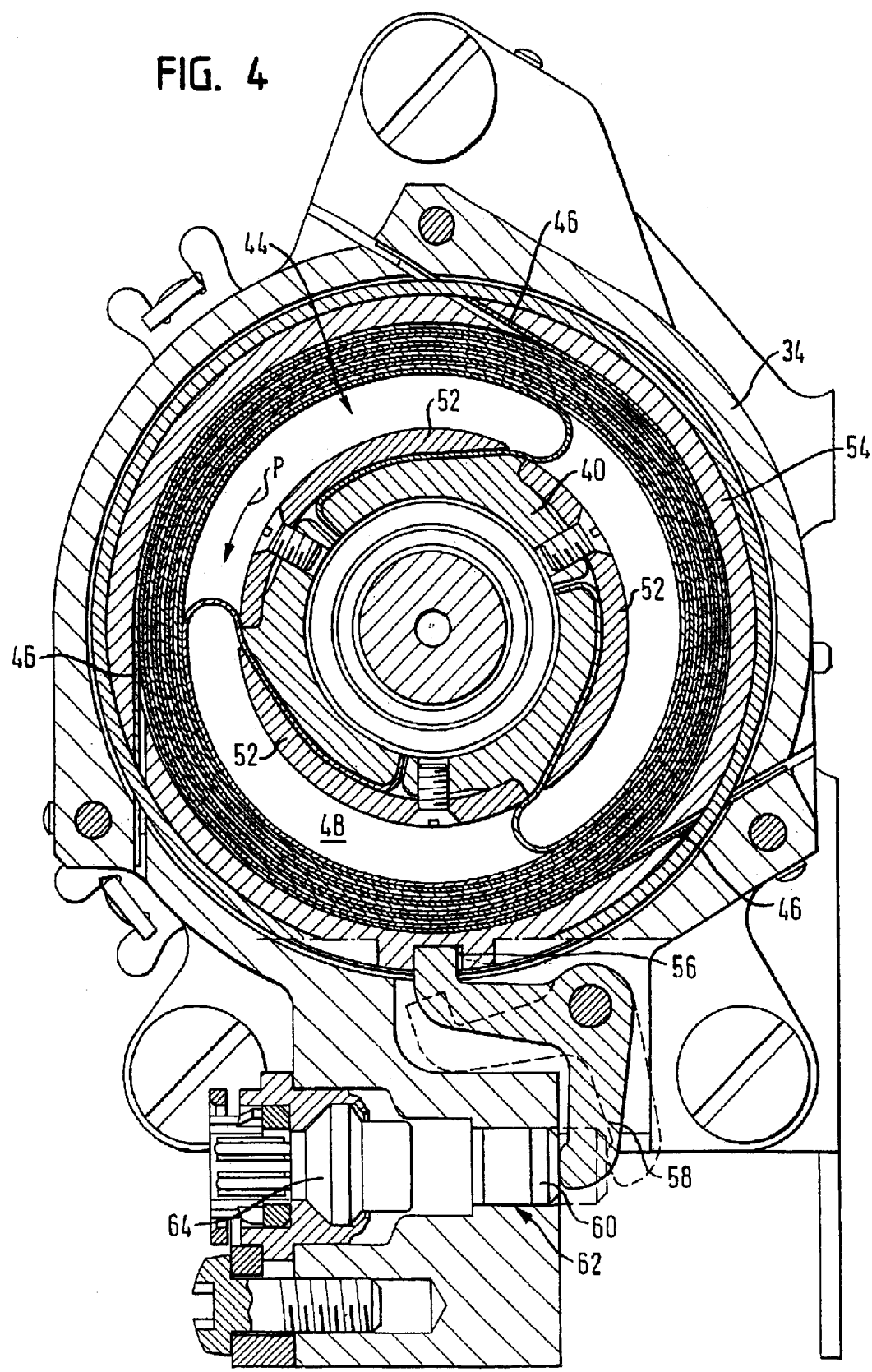
FIG. 4 shows a section along plane IV—IV of FIG. 2.

The second energy converter coil 44 is shown in FIG. 4. In its structure, it substantially corresponds to the first energy converter coil 42 with the difference that the accommodation space 48 is formed in the interior of an outer ring 54, which is rotatably mounted in the housing 34. On the outside of the outer ring 54 a holding recess 56 is formed, in which one end of a holding pawl 58 can engage, which is mounted at the housing. The other end of the holding pawl 58 rests against a piston 60 which is part of a pyrotechnical actuator 62 and can be charged with compressed gas by a gas-generating pyrotechnical charge 64. In the initial condition, i.e. when the actuator is not actuated, the holding pawl 58 is in its position indicated in FIG. 4 with continuous lines, in which it engages in the holding recess 56 and holds the outer ring 54 so as to be non-rotatable with respect to the housing 34.

Figure 3:
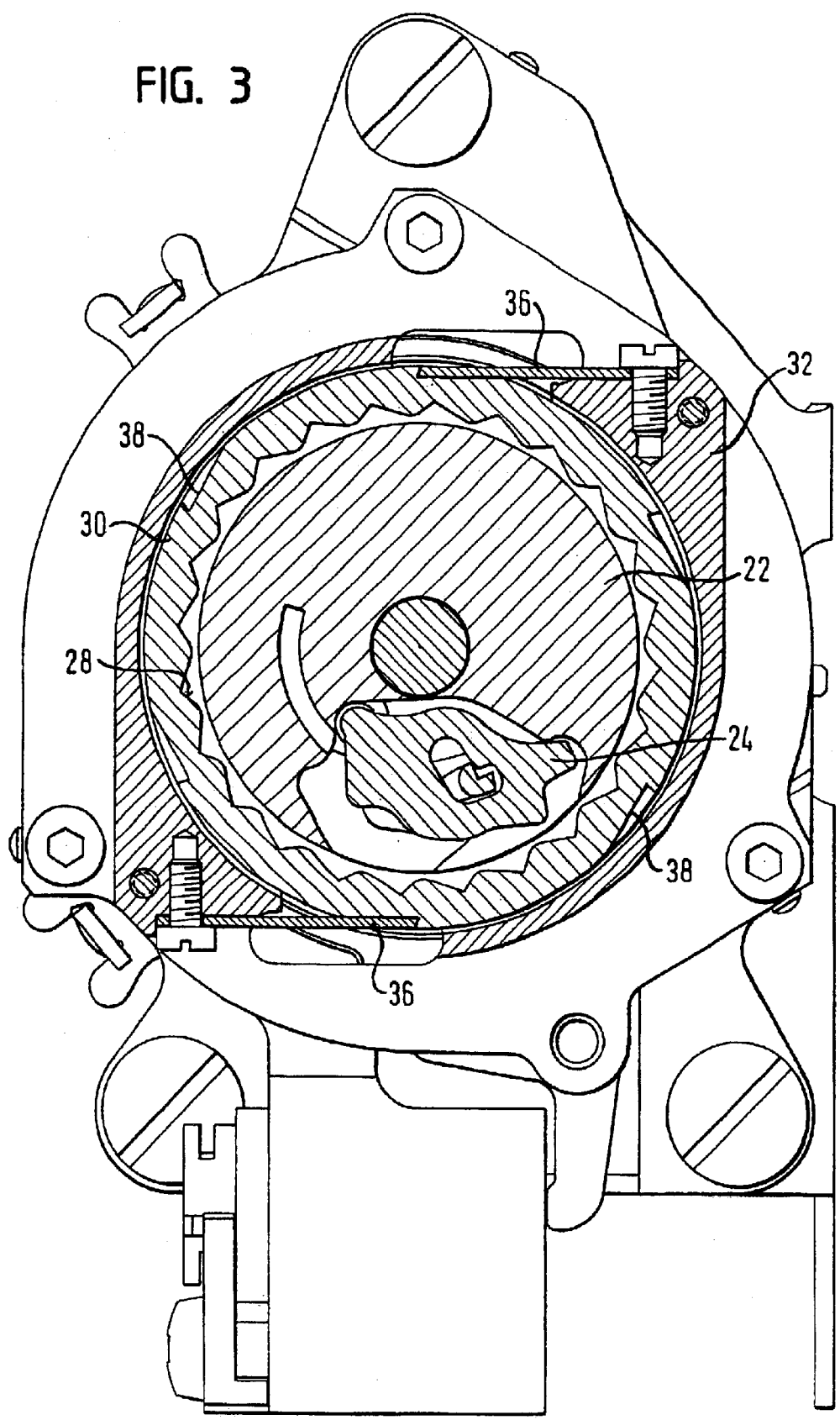
FIG. 3 shows a section along plane III—III of FIG. 2.

In the initial condition of the belt retractor, i.e. when the blocking pawl 24 is in its position shown in FIG. 3, the belt reel 12 can rotate freely under the influence of the wind-up spring 14. As soon as the blocking mechanism is activated, the blocking pawl 24 is moved radially outwards and in engagement with the blocking teeth 28. As a result, the belt reel 12 is basically non-rotatably blocked, as a torque exerted on the same by the safety belt is supported on the housing 34 and thus on the frame 10 via the shaft 16, the blocking disc 22, the blocking pawl 24, the blocking ring 30, the hub 40 and the metal strips 46 of the first energy converter coil 42. The second energy converter coil 44 also serves to support such torque, as in the initial condition the holding pawl 58 engages in the holding recess 56 in the outer ring 54, so that in the end this ring is also non-rotatably held with respect to the frame 10.

As soon as the forces acting in the safety belt exceed a predetermined threshold, the torque acting in the shaft 16 is larger than the resistance torque provided by the energy converter coils 42, 44. Then, the blocking ring 30 rotates in anticlockwise direction with respect to FIG. 3, the leaf springs 36 preventing a reverse rotation. Furthermore, the hub 40 rotates in the direction of the arrow P of FIGS. 4 and 5. The metal strips 46 are unwound from the outer stack and wound up onto the hub 40 in opposite direction. The resistance torque produced is largely determined by the bending resistance of the metal strips 46, which are bent twice at the respective bending point. First, they are bent inwards to a larger extent than corresponds to their former curvature, and subsequently they are bent back in the opposite direction, when the metal strip concerned conforms to the curvature of the hub 40.

As long as the holding pawl 58 is in its position shown in FIG. 4, the two energy converter coils 42, 44 are connected in parallel, and the resistance torque provided by the same is added up. If it is desirable to reduce the force acting in the belt webbing, the second energy converter coil can be deactivated. For this purpose, the gas-generating pyrotechnical charge 64 of the actuator 62 is ignited, whereupon the piston 60 swivels the holding pawl 58 into the position indicated in FIG. 4. In this position, the outer ring 54 can rotate freely, so that the second energy converter coil 44 no longer provides any resistance torque. Thus, a lower tensile force is required in the safety belt for withdrawing belt webbing from the belt reel.

What is claimed is:

1. A belt retractor for a vehicle safety belt, said belt retractor comprising a frame, a belt reel rotatably mounted in said frame, and an energy converter coil having a plurality of metal strips which are disposed symmetrically with respect to a middle axis of said belt reel and form a wound metal strip package, wherein a second energy converter coil is provided which can be selectively deactivated.

2. The belt retractor as claimed in claim 1, wherein said second energy converter coil has an outer ring, a holding pawl being provided by means of which said outer ring can be supported on said frame.

3. The belt retractor as claimed in claim 2, wherein a pyrotechnical actuator is provided to operate said holding pawl.

4. A belt retractor for a vehicle safety belt, said belt retractor comprising a frame, a belt reel rotatably mounted in said frame, and an energy converter coil having a plurality of metal strips which are disposed symmetrically with respect to a middle axis of said belt reel and form a wound metal strip package, wherein mounted to said belt reel is a blocking pawl which can be brought in engagement with blocking teeth of a blocking ring, and wherein said blocking ring is rotatably accommodated in a holding ring at which a leaf spring is mounted, said leaf spring engaging in a pocket on an outer periphery of said blocking ring.

5. A belt retractor for a vehicle safety belt, said belt retractor comprising a frame, a belt reel rotatably mounted in said frame, and an energy converter coil having a plurality of metal strips which are disposed symmetrically with respect to a middle axis of said belt reel, said metal strips providing a resistance torque for limitation of a force acting on said safety belt, said resistance torque being substantially determined solely by a bending of said metal strips, wherein a second energy converter coil is provided which can be selectively deactivated.

6. The belt retractor as claimed in claim 5, wherein said second energy converter coil has an outer ring, a holding pawl being provided by means of which said outer ring can be supported on said frame.

7. The belt retractor as claimed in claim 6, wherein a pyrotechnical actuator is provided to operate said holding pawl.

8. A belt retractor for a vehicle safety belt, said belt retractor comprising a frame, a belt reel rotatably mounted in said frame, and an energy converter coil having a plurality of metal strips which are disposed symmetrically with respect to a middle axis of said belt reel, said metal strips providing a resistance torque for limitation of a force acting on said safety belt, said resistance torque being substantially determined solely by a bending of said metal strips, wherein mounted to said belt reel is a blocking pawl which can be brought in engagement with blocking teeth of a blocking ring, and wherein said blocking ring is rotatably accommodated in a holding ring at which a leaf spring is mounted, said leaf spring engaging in a pocket on an outer periphery of said blocking ring.

* * * * *